May 12, 1970     G. M. WILLIAMS     3,511,729
METHOD OF MANUFACTURING SYNTHETIC OR RESINOUS POLYMER ROLLS
Filed Dec. 10, 1965

_Fig-1_

MAKE A CAST, CURED, BUBBLE-FREE, CONSTANT-GAUGE FILM FROM LIQUID, 100% SOLIDS, POLYMER

↓

APPLY COATING OF THIN CONTINUOUS LAYER OF LIQUID, 100% SOLIDS, UNCURED POLYMER COMPOSITION TO ONE SURFACE OF FILM

↓

WIND FILM AND COATING UP INTO ROLL OF DESIRED DIAMETER, AND CURE

↓

SURFACE GRIND TO EXACT DIMENSIONS AND TOLERANCES REQUIRED

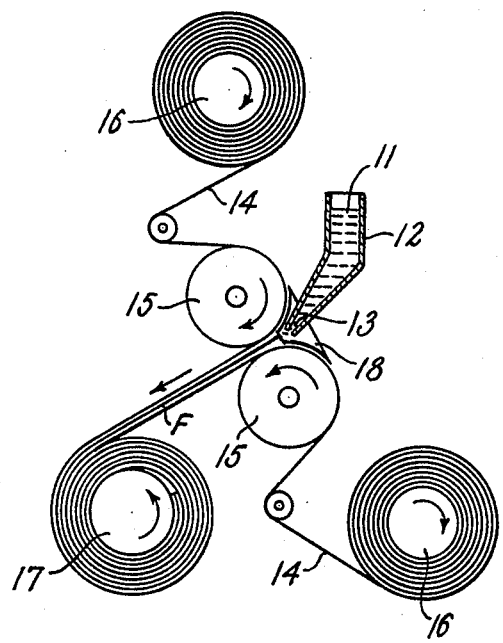

_Fig-2_

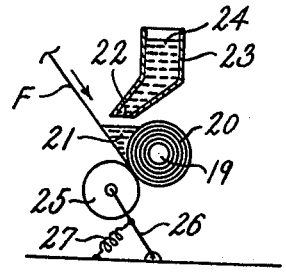

_Fig-3_

INVENTOR
GEORGE M. WILLIAMS
BY Norbert P. Holler
ATTORNEY ated May 12, 1970

United States Patent Office 3,511,729

3,511,729
METHOD OF MANUFACTURING SYNTHETIC OR RESINOUS POLYMER ROLLS
George M. Williams, South Bend, Ind., assignor to Uniroyal, Inc., a corporation of New Jersey
Filed Dec. 10, 1965, Ser. No. 512,917
Int. Cl. B31c 13/00
U.S. Cl. 156—154                            19 Claims

ABSTRACT OF THE DISCLOSURE

The manufacture of cast, void-free rolls of liquid synthetic rubbery or resinous theromsetting polymers is disclosed, together with apparatus designed for this purpose. A roll of the class described is made by applying to one surface of a cured, void-free film of such a thermoset polymer a thin layer of a liquid synthetic rubbery or resinous thermosetting polymer, winding the film into the form of a roll to dispose the layer in adhesion-effecting relation betwen the adjacent turns of the roll, and permitting the layer to cure to render the bond indestructible. Especially where identical polymeric compositions are used for the film and the adhesive layer, upon curing of the latter the roll is found to have become essentially homogeneous in cross-section, with individual turns of the precured film no longer being recognizable as such.

---

This invention relates to the art of manufacturing rolls of polymeric material, and in particular to the manufacture of various types of rolls of specified surface characteristics, resiliency, hardness and/or shaping properties, e.g. inking or printing rolls, laminating rolls, back-up rolls for embossing, stenciling and like units, paper press rolls, etc.

It is an important object of the present invention to provide novel and greatly improved methods of and apparatus for producing cast rolls of certain synthetic rubbery and resinous polymers, which effectively eliminate many disadvantages and drawbacks heretofore encountered in the known methods of casting such rolls.

Another object of the present invention is the provision of means and methods of manufacturing such rolls, which permit an effectively infinite variation of the factors of length and diameter of each roll and thickness of the surface-forming portion thereof to be attained.

Still another object of the present invention is the provision of methods and means which render the production of cast rolls as aforesaid extremely economical, requiring no costly molds and enabling inspection of, and elmination of defects in, the polymeric material prior to the formation of the rolls.

The foregoing and other objects, characteristics and advantages of the present invention will be more clearly understood from the following detailed description thereof when read in conjunction with the accompanying drawing, in which:

FIG. 1 is a flow diagram illustrating the methods of making polymer rolls in accordance with the present invention;

FIG. 2 is a schematic side view, partly in section, of one type of apparatus which may be employed for forming film to be used in practicing the methods of the present invention; and FIG. 3 is a similar view of one type of arrangement for use in forming a roll from such film.

Generally speaking, the preferred starting materials for the manufacture of rolls in accordance with the present invention are cast and cured, bubble-free, constant gauge films up to about 1/16 inch thick and formed from liquid elastomer or semi-rubbery thermoset resin compositions which are curable at either room or elevated temperatures and in the uncured state are liquids composed of 100% polymer or solids, i.e. devoid of water and/or solvents. Such films or sheets may be produced by any of a variety of known casting procedures, e.g. by simply casting, coating or spraying the liquid onto coated release paper or plastic sheet material, release-treated metal surfaces, etc. Alternatively, the film or sheet may be formed by means of a "sandwiching" process and apparatus as disclosed in the copending application of G. H. Cooke and G. M. Williams, Ser. No. 274,183, filed Apr. 19, 1963 (now abandoned) and assigned to the common assignee of the instant application. A roll of the type contemplated by the present invention is then formed by winding such a film or sheet into roll shape of the desired diameter after one of its surfaces has been coated with a thin layer, about 0.5 to 15 mils thick, of a water-free and solvent-free liquid uncured polymeric composition which preferably is identical to the material of which the cured film is composed, and permitting the so-formed roll to cure at either room or elevated temperatures.

The preferred liquid polymers are room temperature curing materials selected from the group consisting of polyurethane prepolymers (isocyanate-terminated polyesters such as Uniroyal, Inc.'s Vibrathane 6001, 6005 or 6006), polysulfide or "Thiokol" rubbers (such as Thiokol Corporation's PCR–40), organopolysiloxane or silicone rubbers (such as General Electric Company's RTV–60), polyepoxide resins, and epoxypolyamide resin blends (such as a mixture of an epoxy resin of the type of Shell Chemical Corporation's Epon 828 and a reactive polyamide resin of the type of the General Mills, Inc. Chemical Division's Versamid 100, 115, 125 or 140). Specifically excluded are solid elastomers such as neoprenes, butyl rubbers, GR–S ethylene-propylene diene rubbers, etc. and any polymeric material which is liquid only in the presence of water or a solvent.

Although, as stated, the constant-gauge films required by the present invention may be formed in a variety of ways, the preferred manner is as disclosed in the aforesaid Cooke and Williams application. Referring to FIG. 2, in accordance with this method, a film F of the type contemplated is formed by permitting a quantity of the liquid polymer 11 contained in a funnel or spout structure 12 to flow through the lowermost open mouth 13, of the spout into the space between a pair of carrier sheets 14 being drawn through a pair of nip rolls 15 from a pair of supply spools 16 and to a wind-up roll 17. The mouth 13 of the spout 12 may be substantially coextensive with the desired width of the film F to be produced as determined by the spacing of a pair of lateral guards 18 (only one is shown in FIG. 2), or the spout may terminate in a relatively narrow mouth and be arranged for reciprocal oscillating movement back and forth between the guards 18. The guards 18 may be spaced somewhat more than the desired film width to enable the latter subsequently to be trimmed to precise dimensions and tolerances. The details of the construction and use of this apparatus, and details of the compounding ingredients of the various film-forming materials as well as the types and physical characteristics of the release carriers 14 usable therewith, are fully set forth in the mentioned Cooke and Williams application, and to facilitate a full understanding of the present invention, therefore, the disclosure of that application is hereby incorporated herein by reference.

In operation, as the sticky gelling polymer 11 is worked by the nip rolls 15 and forced to pass under high pressure through the precisely calibrated nip, it again liquifies sufficiently to spread over the width of the opposed carrier sheets 14 between the guards 18 to form a thin, continuous, constant-gauge film, the two carriers and the film F thus constituting a sandwich or laminate. This sandwich or laminate is then wound up onto the take-up roll or drum 17 on which the film is cured, preferably at room temperature, although an elevated temperature may be employed if the polymer requires it or if accelerated curing is desired. After cure, the laminate is unwound and the carriers separated from the film permitting, the latter either to be rewound onto a suitable take-up spool preparatory to further use, or to be immediately processed in the practice of this invention as will presently be described.

Referring now to FIG. 1, it will be seen that the making of the film or sheet as so far described may be considered as a preliminary step in the process of producing a polymer roll according to the present invention. It should be kept in mind, of course, that the ultimate object of the invention is the provision of void-free, i.e. bubble-free, end rolls. Accordingly, all polymer compositions, before being cast into film form, should be evacuated to ensure the removal of any entrapped air. Most advantageously, this may be achieved by initially preparing or treating the polymer liquid in an air-free reaction or mixing chamber.

When it is desired to produce a roll from such film or sheet, the same in its cured state, and as wide as the intended length of the roll, is provided on one surface thereof with a coating of a thin continuous layer of an uncured liquid polymer composition which preferably is substantially identical with that of which the film itself is made. It will be understood that this uncured polymer layer can be applied to the cured film in any suitable manner, and either as the film is unwound from its storage spool (if there is a hiatus between the formation of the film and the making of the roll) or directly upon the separation of the cured film from the carrier sheets 14 prior to the film being wound onto a suitable roll core (if the roll is to be made as a direct adjunct of the forming of the film). The coated film is wound onto a core and into the form of a roll of substantially the desired diameter (usually slightly in excess of the intended final outside diameter), and the completed roll is then subjected to a curing treatment which, depending on the nature of the polymer composition and the curing rate sought to be attained, may again be either an exposure to normal room temperatures or an exposure to suitably elevated temperatures in a heating chamber or the like.

The layer of uncured polymer thus constitutes an adhesive by means of which, upon curing thereof, the individual convolutions of the roll of film are cemented to each other with an effectively indestructible bond, and surprisingly it is found that upon completion of the curing of the adhesive layer, where it has the same composition as the film, the roll becomes essentially homogeneous in cross-section, i.e. the individual turns of the precured film can no longer be recognized. Although it is not entirely clear why this occurs, it would appear that in the case of identity of the compositions of which the precured film and the uncured layer or coating are formulated, the interface between the film and coating tends to disappear when the latter is cured, possibly because the index of refraction and the surface characteristics of the liquid coating ultimately become the same as those of the film when the coating is fully cured.

It will be understood that the liquid polymer applied as the adhesive coating must also be free of any entrapped air for the reason, hereinbefore set forth with respect to the liquid polymer of which the film is formed, that the end product desired is a roll free of any voids or bubbles. Accordingly, the liquid polymer which is to serve as the adhesive coating preferably should also be evacuated, and care should be taken that no air is trapped between the adjacent turns of the adhesive-coated film during the winding thereof.

Advantageously, this may be achieved by maintaining a small bank or reservoir of the adhesive-forming composition in the region of juncture between the portion of the outermost turn of the film already wound onto the core and the contiguous flat reach of the film just reaching the partly formed roll, while winding the roll under controlled tension. An arrangement of this type is illustrated in FIG. 3, where the precured film F, coming from any suitable source (not shown) and moving in the direction of the arrow, is being wound under tension onto a mechanically driven core 19 into the form of a roll 20. The adhesive layer is formed by entrainment of the uncured liquid polymer from a small bank or reservoir 21 thereof which is initially deposited over substantially the entire width of the film, into the trough-like region defined between the advancing plane reach of the film and the outermost peripheral winding of the roll, through the lowermost open mouth 22 of a funnel or spout structure 23 containing a quantity 24 of the polymer composition. The tension applied to the film F generally determines the thickness of the adhesive layer, and the presence of the bank 21 ensures that no air will be entrapped between the turns of the wound-up roll of film. In order to ensure uniformity of adhesive layer thickness, it is preferred to employ a pressure roll 25 rotatably supported on a pivoted arm 26 or the like and maintained in engagement with the film roll just behind the bank 21 of liquid polymer in any suitable manner as by a compression spring 27, for example. It will be understood that in lieu of a spring the means 27 may be weight biased, or in the form of a hydraulic or pneumatic piston-cylinder arrangement, or it may be omitted altogether if the characteristics of the film being wound permit.

It will further be understood that in compounding any of the polymeric compositions suitable for use in the practice of the present invention, these can be varied by suitable selection of the ingredients, i.e. the rubber or resin or blend of rubber and/or resin as well as any of the well-known cross-linkers and other curing agents therefor, to predetermine such physical properties as film hardness, elongation, etc. and roll hardness, resistance to high temperatures and ambient atmospheric conditions, immunity to attack by materials which may come in contact with the roll during use, etc. Moreover, the herein expressed preference for use of an adhesive polymer composition which is the same as that of which the film is made, is based on the desideratum that the adhesive should not introduce unwanted variations into the physical or chemical surface characteristics of the roll.

This will best be understood when it is considered that, as the last step (see FIG. 1) of the process of the present invention, the cured roll is generally surface ground to exact dimensions over its entire periphery. In the case of printing rolls, of course, the grinding operation also imparts to the roll surface the desired mate finish. As the result of such an operation, therefore, it is possible, depending on the extent of grinding, that in some areas there may be an alternate exposure of polymer materials representing the precured film and the subsequently cured adhesive layer, which could be detrimental if the physical and chemical surface characteristics of the two materials are not the same. Merely by way of example, this might produce alternating "hard" and "soft" lines or regions in the roll surface. The use of the same polymer for both the film and the adhesive layer, however, assures the production of a roll having uniform characteristics over its entire surface.

It will be apparent, of course, that it may be possible to compound any two given non-identical liquid (100% solids) polymer compositions in such a way that, upon curing, their respective hardnesses will approximate, if not duplicate, each other. Under such circumstances, the adhesive layer may be formed from a different polymer than that of which the precured film was made. The same would hold true where, due to the nature of the intended end use of a given type of roll, e.g. as an idler roll or a belt back-up roll, absolute uniformity of hardness characteristics and chemical properties may not be indispensable, either by virtue of being entirely unnecessary or by virtue of the variations being so minimal as to be of negligible concern. Thus, it may be possible to employ as the adhesive-forming liquid (100% solids) polymer an epoxy-polyamide resin blend composition to cement a film made of a polyurethane prepolymer composition, etc.

With respect to the film or sheet F it should be noted that the polymeric material of which it is made generally cures over a period of time. There is, therefore, a gradual build-up in film strength as the cure progresses, which means that it may be possible to handle the film even before it has achieved its full or 100% cure. The designation herein of the film being coated and wound into roll form as "cured" should thus be interpreted in its broadest sense, i.e. that the film may be either fully cured or only cured to a lesser degree but yet sufficiently to have the requisite strength to undergo the winding operation. In the latter case, of course, the film cure will continue after the roll formation, concurrently with the cure of the adhesive layer.

As previously stated, the films employed in the practice of the present invention may be as much as 1/16" thick, but preferably are less than 1/32" thick and generally will be between about 0.002" and 0.020" thick. In actual practice, use of the thicker films in winding small diameter rolls is generally avoided, since the great curvature inherently encountered might create undue stresses in the film. The lower thickness limit of 2 mils is, however, a practical limit only, stemming basically from the fact that thinner films of constant gauge are at the present time difficult to make. The thickness of the adhesive coating will generally be between about 0.0005" and 0.002", although it may be as thick as about 0.015".

From the foregoing it will be seen that one of the principal advantages of the methods of roll manufacture according to the present invention is that the basic material of which the roll is formed, i.e. the precured polymer film or sheet, can be inspected prior to the winding operation for surface defects, bubbles, voids and the like so as to make sure that no seriously defective film portions are incorporated in the roll. Another advantage is that with the film or sheet being quite thin, usually on the order of about 10 mils, any defects in the film or sheet, such as trapped air bubbles which are not discovered, are at worst no larger in the final product than the thickness of the film or sheet used. Like the film-forming liquid polymer, of course, the uncured polymer liquid coated into the precured film must be 100% polymer, i.e. devoid of any solvents, since the presence of solvents in such a coating would be inimical to the quality of the ultimate roll due to their tendency to vaporize on heating or prolonged standing, which would thereby tend to develop a multiplicity of imperfections in the roll.

As previously mentioned, the film or sheet may be formed to a width precisely equal to the intended length of the roll to be manufactured, or its width may initially slightly exceed the roll length to permit the film edges to be trimmed to precise tolerances.

The present invention is further illustrated by the following examples, all references to "parts" being by weight.

EXAMPLE I 100 parts of a polyether-polyurethane prepolymer such as E. I. du Pont de Nemours & Co.'s Adiprene L-100 (a reaction product of a diisocyanate and a polyalkalene ethyl glycol), is heated to approximately 212° F. and is thereafter blended in an air-free continuous mixing chamber with about 9 to 10 parts of a curative, such as du Pont's MOCA (methylene-bis-ortho-chloro-aniline), which, being solid at room temperature, is preheated to about 250° F. to render it sufficiently fluid to blend with the polyurethane prepolymer. The resultant composition, upon exiting from the mixing chamber, is then cast into a bubble-free constant-gauge film .010 inch thick and 60 inches wide by means of the procedure and apparatus of the Cooke and Williams application previously referred to herein, and is permitted to cure at room temperature for a period of about 16 to 24 hours.

The cured film, after being stripped from the release sheets, is coated on one surface with a 0.005 inch thick layer of adhesive constituted by a liquid polymer composition which is the same as was used to make the film, for example in the manner illustrated in FIG. 3, and is wound onto a suitable core into the form of a roll of the desired thickness, if necessary slightly in excess of the prescribed final thickness. The roll so formed is then permitted to air cure at room temperature for about 16 to 24 hours, and thereafter is preferably also postcured at a temperature of about 212° F. for about 2 to 4 hours. At the end of this period, the apparently homogeneous roll is surface ground to exact dimensions and finish characteristics. The roll is found to have a "Shore A" hardness of about 89 to 90 and a resilience of about 30 to 40% of that of natural rubber as determined in accordance with the standards of ASTM-D945-52T. Rolls of this type may be employed, by way of example, as printing rolls, paper mill press rolls and laminating rolls for films and fabrics. The rolls are extremely resistant to oxygen and ozone degradation, but are not resistant to hydrogen donor systems especially at elevated temperatures, e.g. hot water, steam, acids, etc., or to chlorinated solvents and aromatic solvents, including ketones.

It is noted that although in the foregoing example the polyurethane prepolymer is heated to an elevated temperature prior to being blended with the curative, it could be left unheated, i.e. at room temperature.

EXAMPLE II

A silicone rubber sheet or film 72 inches wide and .015 inch thick is prepared by means of the aforesaid Cooke and Williams apparatus from a blend of 100 parts of a 100% solids liquid silicone rubber, e.g. methyl polysiloxane or methyl silicone such as General Electric Company's RTV-60, with about 0.5 part of a curing agent such as dibutyl tin dilaurate. (The amount of curing agent may actually range from about 0.1 to about 10 parts, and other curing agents may also be used, e.g. tin octoate, lead octoate, etc.) The blend is initially formed in any suitable mixing device and is then evacuated, prior to the formation of the film, to remove any entrapped air and ensure that the film is substantially bubble-free. The sandwiched roll of film is cured at room temperature for about 24 hours.

The same silicone rubber composition is then applied as an adhesive coating 0.005 inch thick to one surface of the cured film after the latter is stripped from its "sandwich" release members, whereupon the coated film is wound into a roll of suitable thickness on a core and cured at room temperature for about 24 hours. The cured roll appears homogeneous in cross-section and is then surface ground to final dimensions. The roll is found to have a "Sore A" hardness of 60 and a brittle point of below —90° F., and it is suited for use in such applications as painting, printing, chemicals and food processing, etc. The roll has a non-tacky surface, is highly resistant to hydrogen donor systems, and has good resistance to heat and chemicals.

It is noted that if accelerated curing is desired both the film and the adhesive layer can be cured in as little as about 2 hours at a temperature of about 221° F. Also, if the roll is to be used in a high temperature environment, it is advisable to post-cure the wound roll for a further period of about 16 hours at 450° F.

EXAMPLE III 150 parts of a liquid epoxy resin, such as Shell Chemical Corporation's Epon 828 (a condensation product of epichlorohydrin and bisphenol A) is mixed with 150 parts of a linear reactive polyamide resin such as General Mills, Inc. Chemical Division's Versamid 115 (a condensation product of a dimeric fatty acid and polyamides and having an amine value, i.e. a milligrams equivalent of KOH per gram of resin, of about 210-220), and the resultant epoxy-polyamide composition, properly evacuated, is made into a cured film 60 inches wide and .015 inch thick by means of the apparatus disclosed in the aforesaid Cooke and Williams application. The "sandwiched" film is cured at room temperature for approximately 1½ hours. After the cured film is stripped from the release sheets, an adhesive layer .005 inch thick of the same uncured liquid composition is applied to one surface of the film as the same is wound into a roll of suitable dimensions on a core. This roll is again permitted to cure at room temperature for about 1½ hours, whereupon the roll is found to be of homogeneous cross-section, and thereafter is surface ground to final tolerances. The roll is found to have a hardness of 56 measured by the Sward Hardness Tester made by Henry A. Gardner Laboratories, Inc. of Bethesda, Md., and to have the expected physical and chemical resistance properties, and is useful as a printing roll, a back-up roll and in various applications requiring rolls somewhat harder than those of Examples I and II.

If accelerated curing of the film and/or adhesive layer is desired, the cure may be effected in about 5 to 10 minutes by heating the film and/or roll to a temperature between about 150° and 200° F.

EXAMPLE IV

The herein described film and roll-forming procedures are repeated, using as the material for both the film and the adhesive a composition made by adding to and mixing with 100 parts of the blend of epoxy and polyamide resins set forth in Example III, 25 parts of a liquid polysulfide rubber such as Thiokol Chemical Corporation's Thiokol LP-3, and 5 parts of a curative such as Rohm & Haas Company's DMP-30 (2,4,6 - tri(dimethylaminomethyl) phenol). This new composition cures in approximately 2 hours at room temperature, or in about 10 to 15 minutes when heated to a temperature between about 150° and 200° F. The resultant homogenous cross-section roll is found to be somewhat more rubbery than the roll of Example III, and is useful in similar applications, e.g. for applying a lacquer by printing techniques.

From the foregoing it will be readily apparent that the present invention provides a number of advantages in the manufacture of polymer rolls which are not found in the known and conventional practices of this art. Thus, since the film made by the method of the prior Cooke and Williams disclosure is principally characterized by the absence of bubbles or entrapped air, the finished roll is likewise substantially free of any voids or bubbles. Moreover, the use of the thin precured film or sheets as the roll-forming material makes it possible for the manufacture to inspect the film before it is wound into a roll for the purpose of detecting and, if necessary, eliminating any defects in the film prior to the winding operation. This safeguard against defective end products is quite obviously impossible to attain in conventional roll casting operations. The use of such film also eliminates the need for the provision of the heretofore required great numbers of molds, one for each size, for the rolls to be produced, and in fact makes it feasible to produce, with a minimum of equipment and in the most economical fashion possible, rolls of an almost infinite variety of sizes (lengths, outside diameters and radial thicknesses of the polymer portions).

It is to be understood that the foregoing disclosure of details of the present invention is for purposes of illustration only, and that various changes and modifications may be made in the materials, proportions and operating conditions set forth without departure from the spirit and scope of the present invention as defined in the hereto appended claims.

Having thus described my invention, what I claim and desire to secure by Letters Patent is:

1. The method of producing a roll the outside surface of which is defined by cured polymeric material which in its uncured state is a liquid composed of 100% polymer, comprising the steps of applying to one surface of a cured film or sheet of said polymeric material a layer of uncured liquid polymeric material which in its uncured state is a liquid composed of 100% polymer, winding said film or sheet into the form of a roll of desired dimensions, whereby said layer of uncured liquid polymeric material is interposed in an adhesion-effecting relationship between the adjacent turns of the roll, and subjecting said roll to a curing treatment, whereby said layer of polymeric material upon being cured creates an indestructible bond between said turns of said roll.

2. The method of claim 1, wherein the uncured polymeric material employed in forming said film or sheet is selected from the group consisting of polyurethane prepolymers, silicone rubbers, polysulfide rubbers, polyepoxide resins, blends of polyepoxide and polyamide resins, and blends of polyepoxide resins, polyamide resins and polysulfide rubbers.

3. The method of claim 1, wherein the uncured polymeric material employed in forming said layer is selected from the group consisting of polyurethane prepolymers, silicone rubbers, polysulfide rubbers, polyepoxide resins, blends of polyepoxide and polyamide resins, and blends of polyepoxide resins, polyamide resins and polysulfide rubbers.

4. The method of claim 1, wherein the composition of the uncured polymeric material employed in forming said layer is the same as that of the uncured polymeric material employed in forming said film or sheet.

5. The method of claim 4, wherein said uncured polymeric material is selected from the group consisting of polyurethane prepolymers, silicone rubbers, polysulfide rubbers, polyepoxide resins, blends of polyepoxide and polyamide resins, and blends of polyepoxide resins, polyamide resins and polysulfide rubbers.

6. The method of claim 5, wherein said uncured polymeric material is a polyurethane prepolymer.

7. The method of claim 5, wherein said uncured polymeric material is a silicone rubber.

8. The method of claim 5, wherein said uncured polymeric material is a polysulfide rubber.

9. The method of claim 5, wherein said uncured polymeric material is a polyepoxide resin.

10. The method of claim 5, wherein said uncured polymeric material is an epoxy-polyamide resin.

11. The method of claim 5, wherein said uncured polymeric material is a blend of a polyepoxide resin, a polyamide resin and a polysulfide rubber.

12. The method of claim 1, wherein the composition of the uncured polymeric material employed in forming said layer is different from that of the uncured polymeric material employed in forming said film or sheet.

13. The method of claim 1, wherein said film or sheet when cured is less than about 1/16 inch thick.

14. The method of claim 1, wherein said film or sheet when cured is between about 0.002 and 0.020 inch thick.

15. The method of claim 1, wherein said layer of uncured polymeric material is between about 0.0005 and 0.015 inch thick.

16. The method of claim 1, comprising the further step of surface grinding the fully cured roll to precise dimensional tolerances and surfaces finish charactistics.

17. The method of claim 1, wherein the application of said layer comprises depositing a bank of said uncured liquid polymeric material into the trough-like region defined between the outermost turn of the partly wound-up film or sheet and the advancing plane reach of said film or sheet adjacent said outermost turn, whereby said uncured polymeric material is entrained from said bank as the winding action proceeds to form the layer interposed between the adjacent turns of the roll.

18. The method of claim 17, wherein said film or sheet is wound into roll shape under tension.

19. The method of claim 17, wherein a rotatable roller is maintained in rolling surface contact with the exterior of the roll as it is formed.

References Cited

UNITED STATES PATENTS

| | | | |
|---|---|---|---|
| 1,321,401 | 11/1919 | Sommer et al. | 264—213 |
| 2,007,578 | 7/1935 | Madge et al. | 156—281 |
| 2,637,876 | 5/1953 | Cory | 264—175 |
| 2,771,388 | 11/1956 | Rocky et al. | 156—242 |
| 3,190,947 | 6/1965 | Norcross | 264—216 |

JOHN T. GOOLKASIAN, Primary Examiner

J. D. SMITH, Assistant Examiner

U.S. Cl. X. R.

29—132; 156—187, 242, 550